(12) United States Patent  (10) Patent No.: US 6,499,884 B1
Svihla et al.                (45) Date of Patent:    Dec. 31, 2002

(54) BEARING/SEAL MEMBER/ASSEMBLY AND MOUNTING

(75) Inventors: Gary R. Svihla, Chicago, IL (US); Eric J. Duve, Riverside, IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/676,582

(22) Filed: Sep. 29, 2000

(51) Int. Cl.⁷ .............................................. F16C 27/02
(52) U.S. Cl. ...................................... 384/138; 384/901
(58) Field of Search ................................. 384/138, 144, 384/147, 148, 151, 152, 480, 484, 901

(56) References Cited

U.S. PATENT DOCUMENTS 5,141,339 A * 8/1992 Evans ......................... 384/130
5,957,461 A * 9/1999 Ulrich ......................... 384/138

* cited by examiner

Primary Examiner—Lenard A. Footland
(74) Attorney, Agent, or Firm—Cary W. Brooks

(57) ABSTRACT

A gas dynamic machine, such as a turbocharger, compressor or turbine, includes a housing and a rotor mounted in the housing and rotatable on an axis. A bearing and seal member or assembly includes a bearing mounted in an axial bore of the housing and having an inner bearing surface radially supporting a bearing journal of the rotor An axial oil seal is aligned with and fixed to the bearing for radially positioning the seal in axial alignment with the journal bearing surface of the bearing/seal assembly. The seal may further include a generally radial flange fixed to the housing for axially positioning the bearing/seal assembly relative to the rotor. The bearing and seal may have separate bodies attached together or be combined in an integral body. Mounting with a single radial pilot for radial location and a single radial flange for axial location, which may be combined, is featured. An optional thrust flange may be integral with the bearing portion or attached as a separate body.

32 Claims, 6 Drawing Sheets

BEARING/SEAL MEMBER/ASSEMBLY AND MOUNTING

TECHNICAL FIELD

This invention relates to gas dynamic machines, such as turbochargers, compressors, turbines and the like and, more particularly, to a bearing and seal member or assembly for and in combination with a gas dynamic machine.

BACKGROUND OF THE INVENTION

It is known in the art relating to gas dynamic machines, such as turbochargers, compressors, turbines, and the like, to provide a rotor supported in a housing on one or more oil lubricated bearings. An axial seal may be provided adjacent the bearing to control leakage of oil from the bearing into a compressor or turbine of the machine. Axial alignment of the seal with the bearing is generally required to provide proper seal operation. To accomplish this, concentric pilots or bores may be provided in the machine housing, a bearing being mounted in one of the bores and a seal member mounted in the other. The result is that close machine tolerances must be held in both the bearing and seal components and the pilot bores of the housing in order to obtain the desired concentricity. Installation and removal of the components may also be complicated and may require special tooling for servicing of the machine. An improved bearing and seal mounting was desired to improve the operation, manufacture installation and servicing of rotor bearings and seals for a gas dynamic machine.

SUMMARY OF THE INVENTION

The present invention provides a new bearing/seal member or assembly and a modified mounting in a gas dynamic machine, which accomplish the above-mentioned goals in an engine turbocharger and other similar machines.

In a first embodiment, the bearing and seal portions of the assembly are made as separate bodies provided with mating alignment portions that maintain axial alignment of the bearing and seal surfaces when the components are fixed together as an assembly. The assembly is radially positioned by a single pilot bore of the housing in which the bearing portion is mounted. Concentricity of the bearing and seal portions is thus determined only by the alignment portions of the bearing and seal bodies themselves and does not depend upon the tolerances of dual housing pilot bores. The axial positioning of the assembly is also determined by a single flange formed, in this case, as part of the seal body. Preferably, a thrust flange or thrust bearing surface is formed integrally on the bearing body, axially aligned with the bearing surface on an end opposite the seal body. If desired, the thrust flange could be separately mounted on the bearing body.

In use, the bearing and seal bodies are assembled with their bearing and seal surfaces in alignment and fixed together by fasteners prior to installation in the turbocharger housing. The assembly is then assembled into the housing with a pilot surface of the bearing portion supported in the housing pilot bore. The radial flange of the seal portion is then secured to a radial mounting face of the housing by, for example, screw fasteners to retain the assembly in place. The bearing/seal assembly is easily installed and may be easily removed without special tooling.

In an alternative embodiment, the bearing and seal portions are formed integrally in a single body. The body includes a single radial mounting flange, which carries a peripheral external pilot surface on the flange for engaging a pilot bore of a turbocharger housing to radially position the body in the housing. The mounting flange also is engagable with the housing for axially positioning and mounting the body in the housing. Preferably, a thrust flange having a thrust bearing surface is separately formed and attached to the bearing/seal body at the end adjacent the bearing portion. If desired, the thrust bearing surface could be formed integral with the bearing/seal body. The bearing portion of the body includes an inner bearing surface in which a floating bearing bushing with squeeze film damping is preferably received. Alternatively, a fixed bearing insert or a directly formed bearing material could be carried by the inner bearing surface.

These and other features and advantages of the invention will be more fully understood from the following description of certain specific embodiments of the invention taken together with the accompanying drawings.

DESCRIPTION OF THE PREFERRED EMBODIMENT

Figure 1:
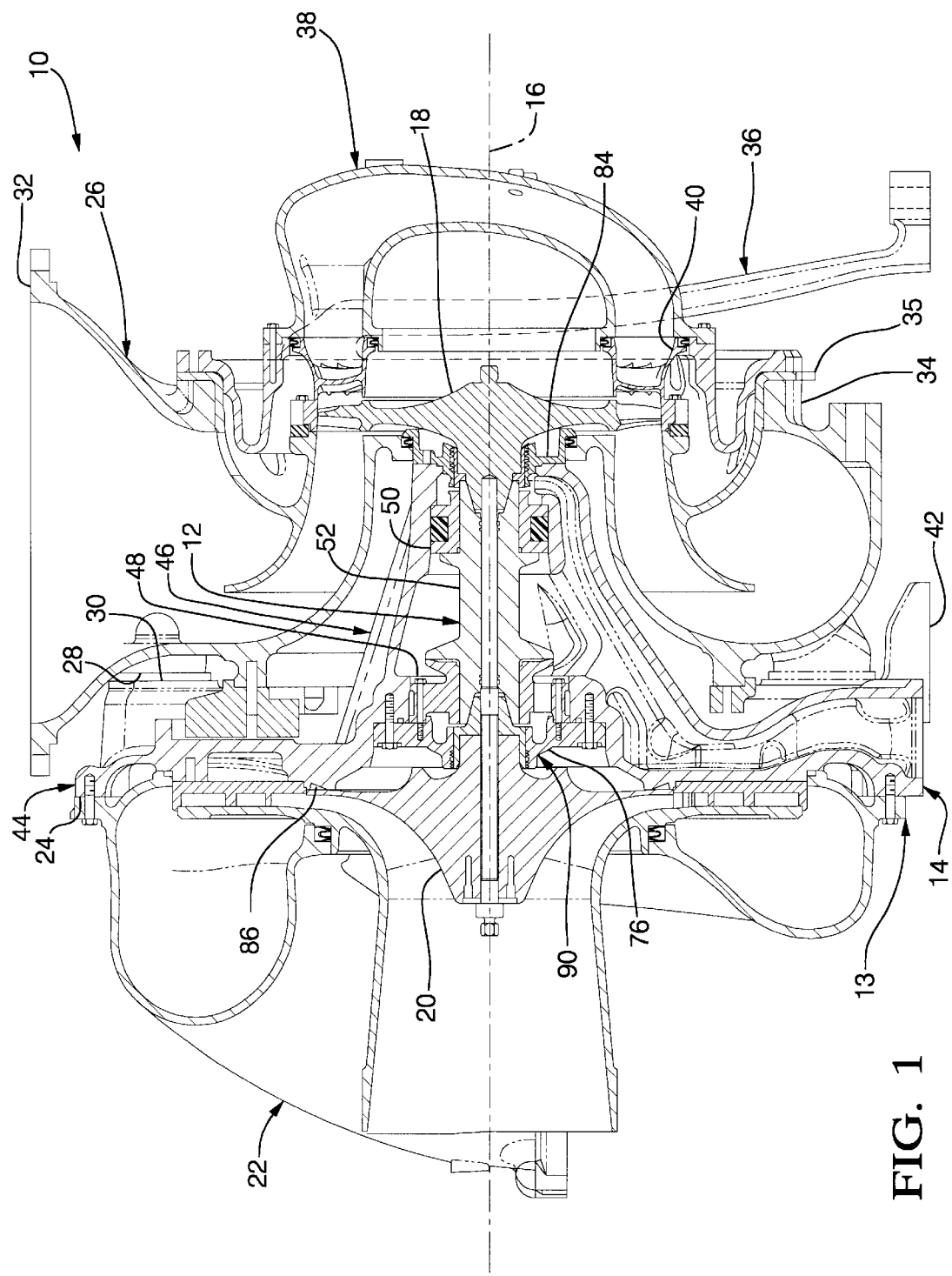
FIG. 1 is a cross-sectional view of an engine turbocharger having a single pilot mounted bearing/seal assembly according to the invention.

Referring now to the drawings in detail, numeral 10 generally indicates an exhaust driven turbocharger for an engine, such as a diesel engine intended for use in railway locomotives or other applications of medium speed diesel engines. Turbocharger 10 includes a rotor 12 carried in a housing 13 by a rotor support 14 for rotation on a longitudinal axis 16 and including a turbine wheel 18 and a compressor wheel 20. The compressor wheel is enclosed by a compressor housing assembly 22 including components which are supported on an axially facing first side 24 of the rotor support 14. An exhaust duct 26 has a compressor end 28 that is mounted on a second side 30 of the rotor support 14 spaced axially from the first side 24.

The exhaust duct 26 is physically positioned between the rotor support 14 and the turbine wheel 18 to receive exhaust gases passing through the turbine wheel and carry them to an exhaust outlet 32. A turbine end 34 of the exhaust duct 26 and an associated nozzle retainer assembly 35 are separately supported by an exhaust duct support 36 that is connected with the exhaust duct 26 at the turbine end 34. The exhaust duct support 36 also supports a turbine inlet scroll 38 which receives exhaust gas from the associated engine and directs it through a nozzle ring 40 to the turbine wheel 18 for transferring energy to drive the turbocharger compressor wheel 20. The rotor support 14, compressor housing assembly 22, exhaust duct 26, nozzle retainer assembly 35 and exhaust duct support 36 are all included as portions of the housing 13 of the turbocharger 10 that represents one example of a gas dynamic machine according to the invention.

The rotor support 14 includes a pair of laterally spaced mounting feet 42 which are rigidly connected to an upstanding mounting portion 44 of the rotor support 14 and are adapted to be mounted on a rigid base, not shown. The rotor support 14 further includes a tapering rotor support portion 46 having bearings 48, 50 that rotatably support the rotor 12. Bearing 48 is a combination journal and thrust bearing, while bearing 50 is primarily a journal bearing.

The rotor 12 includes a shaft 52 connected with the turbine wheel 18 at one end and the compressor wheel 20 at the opposite end. The shaft 52 includes a pair of axially spaced bearing journals 54, 56 respectively adjacent the compressor and turbine wheel ends of the shaft. A flange, inboard of journal 54, carries a radial thrust reaction surface 58. A second flange adjacent journal 56 carries a radial surface 60. Journals 54, 56 are respectively supported in bearings 48, 50. Radial surface 58 carries thrust forces to the journal/thrust bearing 58 and radial surface 60 limits axial movement of the rotor.

Connecting means of any suitable type may be provided for aligning and connecting the compressor and turbine wheels on their respective ends of the shaft 52. The aluminum alloy compressor wheel 20 includes an axially aligned cylindrical stub 62 on which is fixed an adapter 64 including an outer seal surface 65. For the compressor wheel 18, the connecting means comprise a pair of non-locking cones between the adapter 64 and the shaft 52. For the turbine wheel 18, the connecting means include non-locking cones between the turbine wheel and the shaft 52. A seal collar 66 fixed on the turbine wheel adjacent the cones includes an outer seal surface 68. The rotor elements are secured together by fastener means including a nut 70 and a long stud 72, or a bolt, that extends through the compressor wheel 20 and shaft 52 to engage the turbine wheel 18. The stud and nut hold the non-locking cones in engagement to maintain the compressor and turbine wheels in axial alignment on the shaft 52. Suitable mechanical stops may be provided between the shaft and wheel elements of the rotor to provide angular orientation and allow reassembly of the elements in predetermined angular relation.

The outer seal surface 65 of adapter 64 is an outer cylinder located between the compressor wheel 20 and bearing journal 54, which is supported by oil lubricated bearing 48 (FIG. 1). The outer cylinder 65 is surrounded by an inner seal surface or cylinder 74, formed by a bore in a compressor seal 76 having a radial mounting flange 78 fixed to a radial mounting face 80 of the housing 13 at the compressor end of the support portion 46. Similarly, the outer seal surface 68 of seal collar 66 is an outer cylinder located between the turbine wheel 18 and bearing journal 56, which is supported by oil lubricated bearing 50. The outer cylinder 68 is surrounded by an inner seal surface or cylinder 92, formed by a bore in a turbine seal 84 fixed to the rotor support 14 at the compressor end of the support portion 46. The outer cylinders 65, 68 are centered within the inner cylinders 74, 82 with a predetermined close clearance selected to enhance sealing action of dual phase seals partially defined by opposing cylinders 65, 68 and 74, 82.

The outer cylinders 65, 68 are each provided with auger seal grooving consisting of a multi-start helical thread cut into the outer cylinders 65, 68. The threads lie opposite smooth bore portions on the inner ends of the associated inner cylinders 74, 82. The threads have helix angles turning in opposite directions, chosen so that rotation of the rotor causes a viscous pumping action of the threads against the smooth bores that forces oil entering the clearance back toward the associated bearings.

The inner cylinders 74, 82 are each provided with labyrinth seal grooving consisting of spaced circumferential lands and grooves cut into the outer ends of the inner cylinders 74, 82. The labyrinth seal grooving lies opposite smooth surfaced portions of the associated outer cylinders 65, 68. A central groove receives air pressure through passages in the compressor seal 76 and the turbine seal 84. The air pressure is received from an annular groove 86 in the turbocharger rotor support mounting portion 44 (FIG. 1) behind the back face of the compressor wheel near its outer periphery. The air pressure is carried through internal passages and distributed across the clearance from the smooth surfaced portions of the outer cylinders 65, 68 and partially flows back through the clearance toward the adjacent bearings 48, 50, further preventing the passage of oil through the clearance toward the compressor and turbine wheels. The complementary auger seals and labyrinth seals in the cooperating cylinders provide non-rubbing seal assemblies as used in the described turbocharger. However other suitable forms of axial seals, whether non-rubbing or not, could also be applied within the scope of the present invention.

In accordance with the invention, the bearing 48 and the compressor seal 76 are fixed together in a bearing/seal assembly 90 by suitable fasteners in the form of six screws 92. The bearing 48 includes a body 94 having an inner bearing surface 96 surrounding and radially supporting the bearing journal 54 of the rotor shaft 52. A radial mounting flange 98 is provided having an outer mounting surface including first and second circular or generally cylindrical pilot portions 100, 102 separated by an oil distribution groove 104 for supplying oil to the bearing surface 96. A thrust flange extends from one end of the bearing body 94 and includes a thrust bearing surface 106 engagable with reaction surface 58 of the rotor shaft 52. At its other end, the body 94 includes a seal aligning portion 108 including radial end and internal cylindrical surfaces, not shown.

The compressor seal 76 includes a seal body 110 that carries the seal inner cylinder 74, previously described, which is connected with the radial flange 78. An inner portion of the flange 78 includes a radial face 112 with an inwardly adjacent cylindrical guide portion 114. These together form a mating aligning portion of the seal, which engages the seal aligning portion 108 of the bearing body 94 to insure close axial alignment of the seal inner cylinder 74 with the inner bearing surface 96 of the bearing body 94. An outer portion of the flange 78 includes a radial surface 116 that engages the mounting face 80 of the rotor support portion 46 of the turbocharger housing 13.

In use, the bearing 48 and seal 76 are separately manufactured to close tolerances. These members are then assembled with the seal aligning portion 108 of the bearing 48 engaging the mating aligning portions 112, 114 of the seal 76. Screws 92 are inserted from the inner side of the bearing 48 through holes in the flange 98 to engage threaded openings in the radial face 112 of the seal 76 and fix the components together in the bearing/seal assembly 90 of the invention. The members 48, 76 of the bearing/seal assembly 90 are thus fixed with inner bearing surface 96 and the inner cylinder 74 of the seal in close axial alignment.

Assembly 90 is then installed into the housing 13 from the compressor end. The generally cylindrical pilot portions 100, 102 of flange 98 are received in a close fitting generally cylindrical bore 118 in the rotor support portion 46 of the housing 13. The radial flange 78 of the seal body is not closely fitted radially within the housing 13. Instead, the seal body 110 relies upon the mounting of the bearing body 94 of bearing 48 for radial support and alignment. The diameter of the bore 118 may vary slightly at its opposite ends to assist installation and to mate closely with the pilot portions 100, 102, of which the inner pilot portion 100 is slightly smaller in diameter. The close fit of the mounting flange 98 in the bore 118 insures the axial alignment of the bearing/seal assembly 90 with the axis of the rotor 12 and housing 13.

The bearing/seal assembly 90 is axially fixed in the housing 13 by screws 120 installed from the outer side through holes in the seal flange 78 to engage threaded openings in the rotor support portion 46 of the housing. The flange 78 is thus fixed against the mounting face 80 to axially position both the bearing 48 and the seal 76 in the housing 13.

Figure 2:
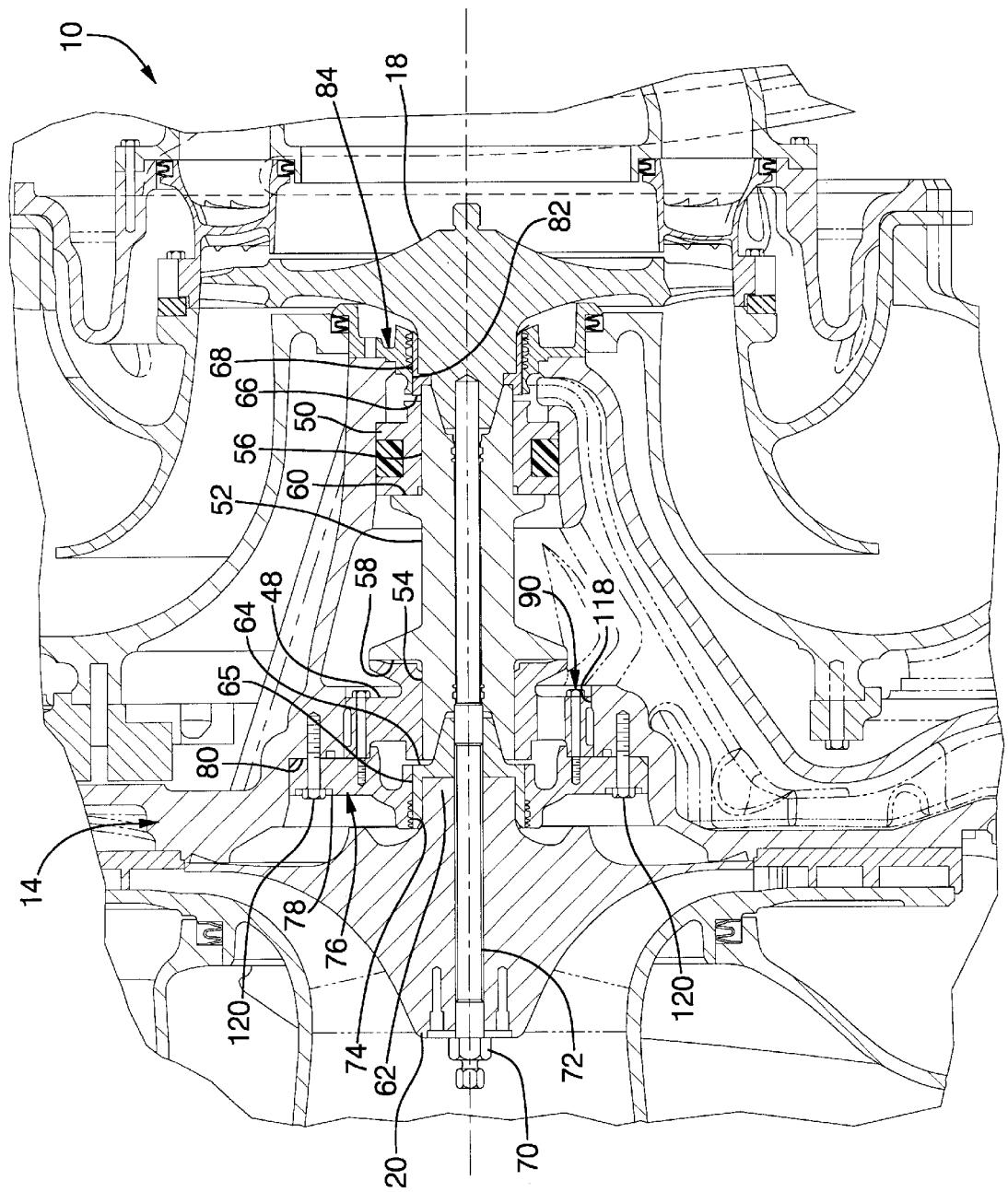
FIG. 2 is an enlarged view of the bearing/seal mounting portion of FIG. 1.
Figure 3:
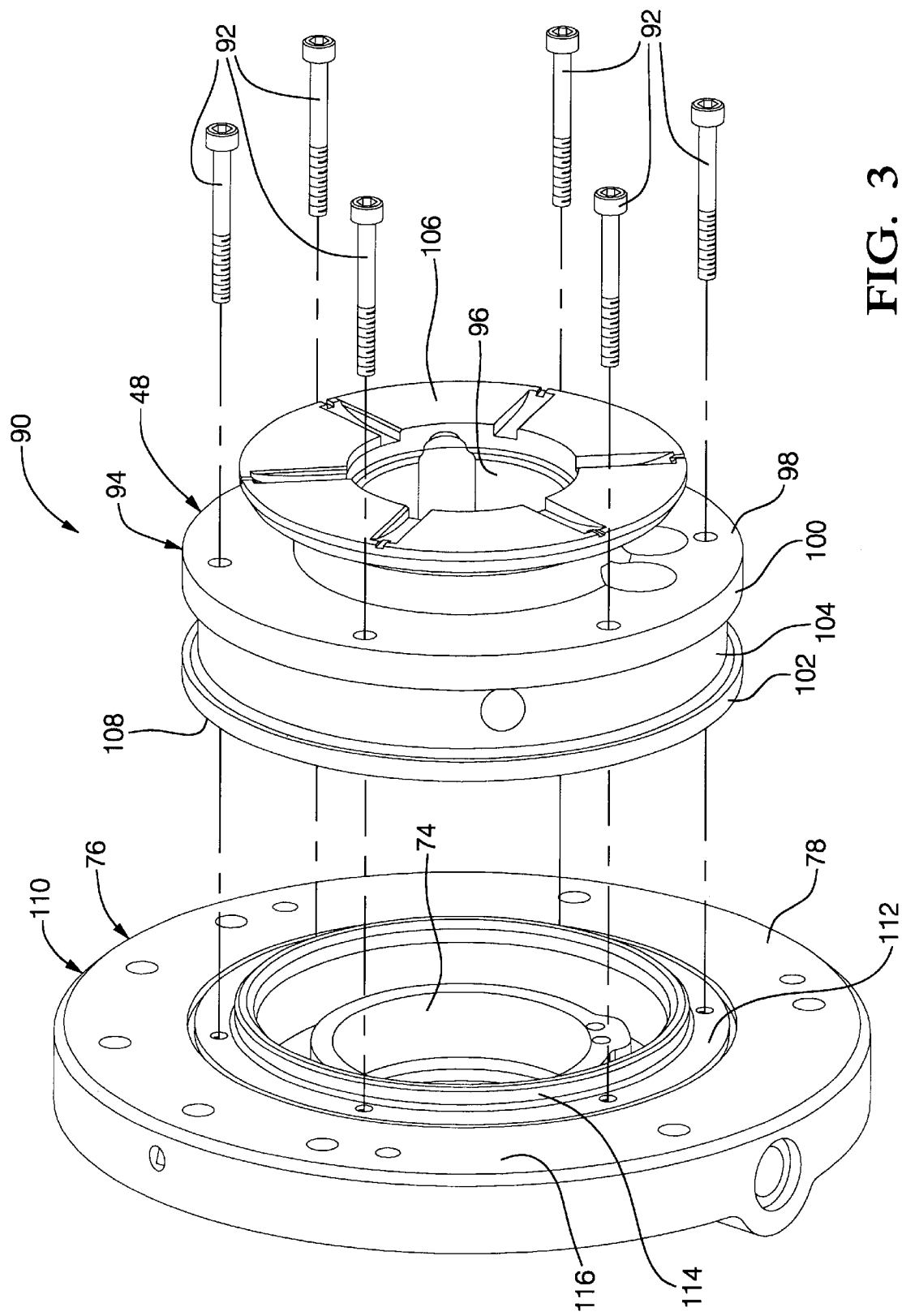
FIG. 3 is an exploded pictorial view of the bearing/seal assembly of FIGS. 1 and 2.
Figure 4:
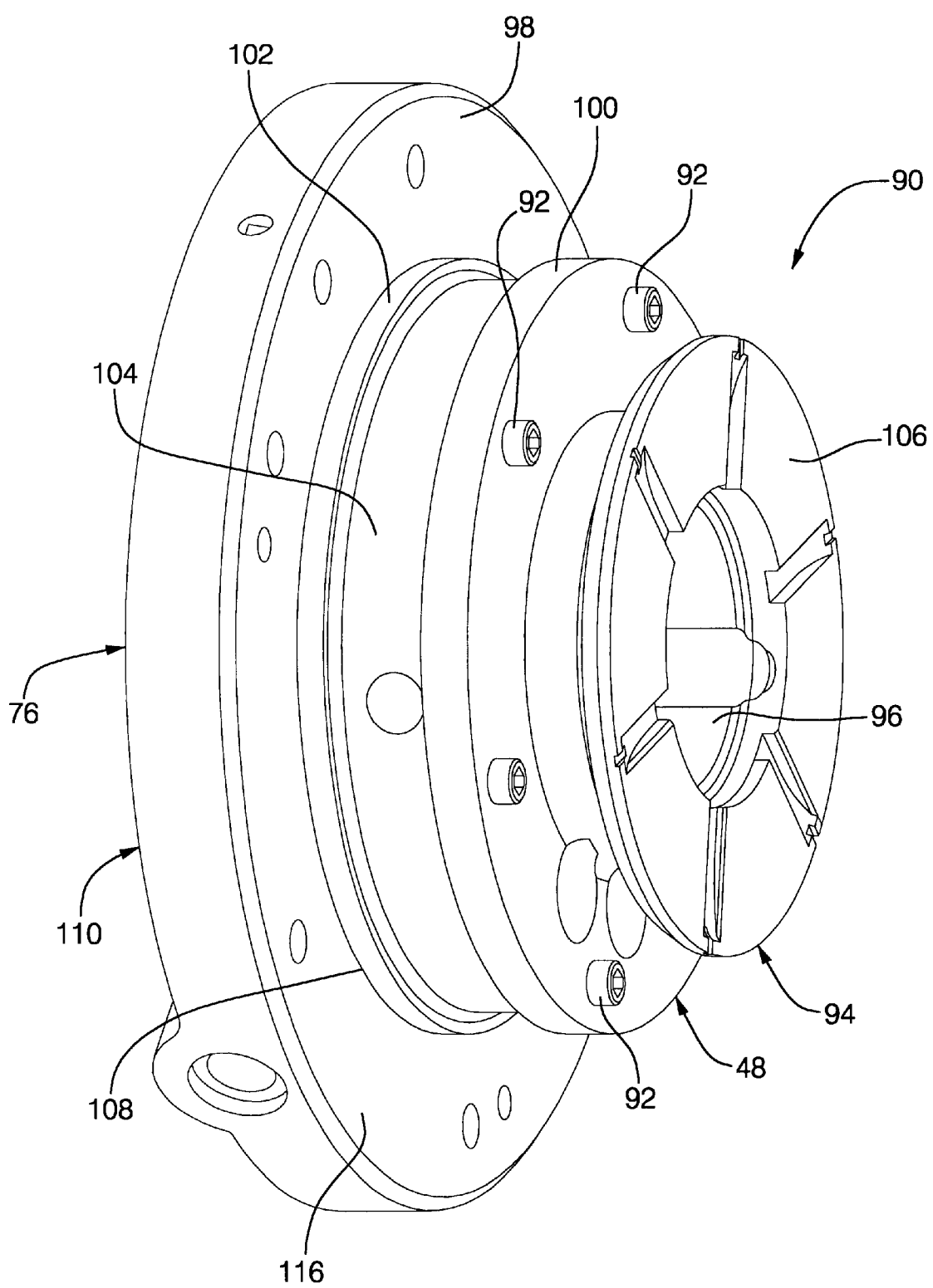
FIG. 4 is a pictorial view of the assembled bearing/seal assembly.
Figure 5:
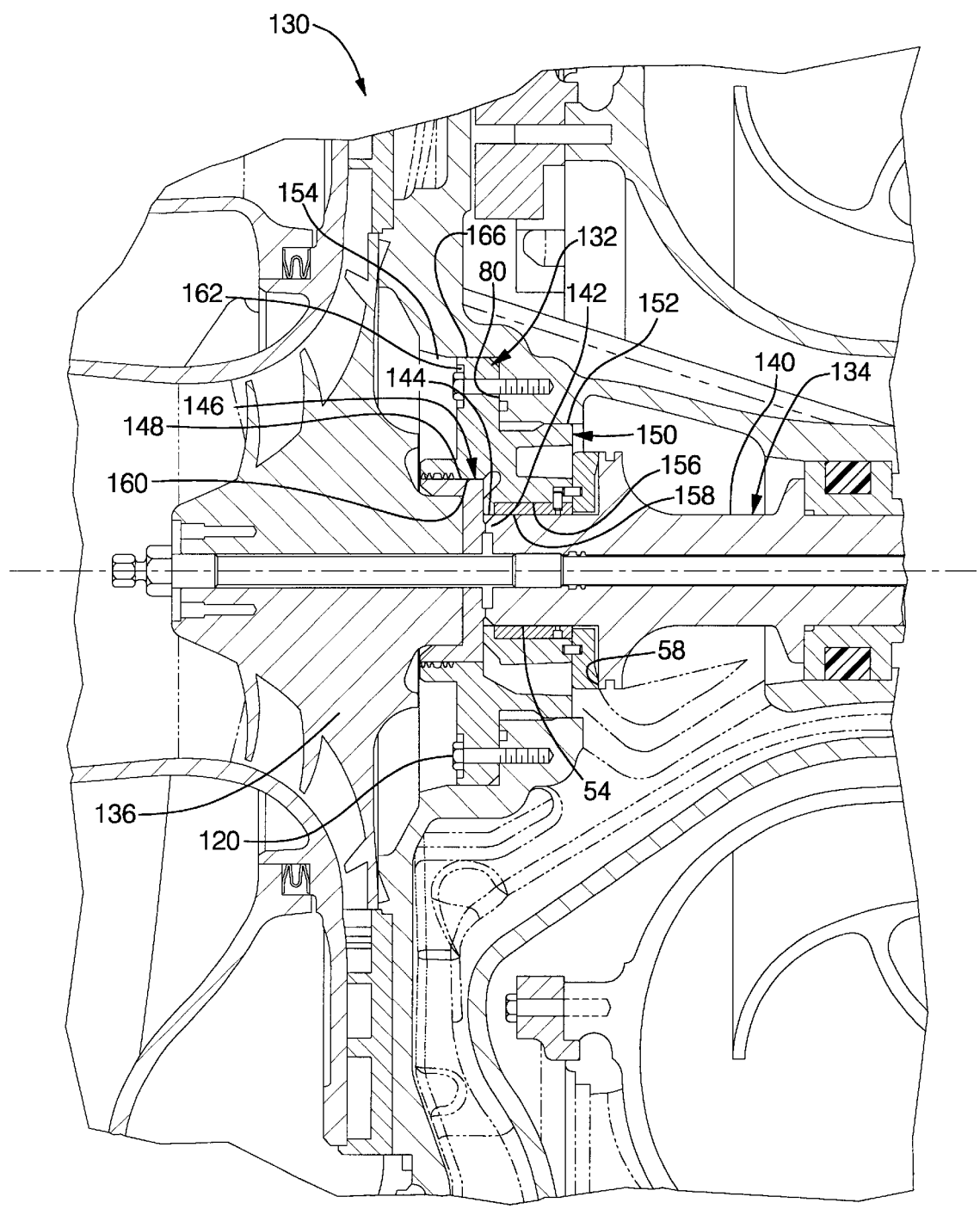
FIG. 5 is a fragmentary cross-sectional view of a modified turbocharger having an integrated bearing/seal member with attached thrust bearing according to the invention.
Figure 6:
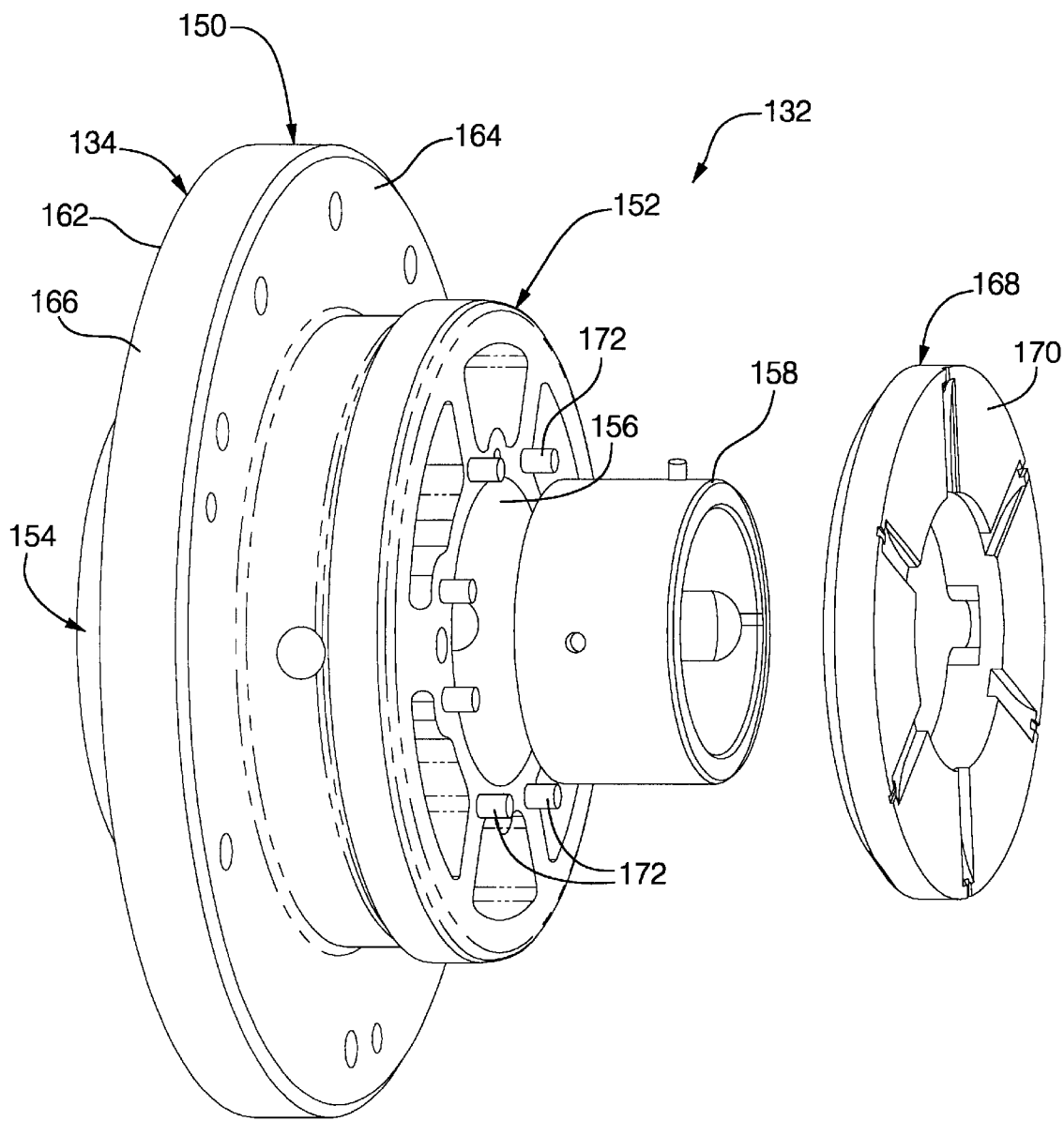
FIG. 6 is an exploded pictorial view of the bearing/seal member of FIG. 5.

Referring to FIG. 5, the compressor bearing mounting portion of a modified engine turbocharger 130 is shown having features similar to those of turbocharger 10 and in which like numerals are used for like parts. Turbocharger 130 differs primarily in the structure of a compressor bearing/seal member 132, which forms a part of the present invention, and the drive arrangement for the rotor 134, which does not. The rotor includes the compressor wheel 136 and turbine wheel, not shown, connected by a shaft 140, all similar to components of rotor 12. However, instead of a cone drive connection, rotor 134 includes mating toothed couplings 142, 144 on the shaft 140 and on an adapter 146 carried on a stub of the compressor wheel 136. Similar couplings are used between the shaft 140 and the turbine wheel, not shown. The adapter 146 also provides an outer seal surface 148 forming an outer cylinder having a smooth surface at the compressor end and auger seal grooving at the shaft end similar to the corresponding cylinder 65 of FIG. 2.

In accordance with the invention, the compressor bearing/seal member 132 includes an integral body 150 having a bearing portion 152 at one end and a seal portion 154 at the other end. The bearing portion 152 includes an inner bearing surface 156 fed by internal oil passages. A floating bearing bushing 158 incorporating a squeeze film damper is received in the inner bearing surface for supporting the associated shaft bearing journal 54. However, other bearing arrangements, such as sleeve bearings or integrated bearing materials, could be used with the inner bearing surface in suitable turbocharger applications.

The seal portion 154 includes a seal inner cylinder 160 (FIG. 5) including labyrinth seal grooving at the compressor wheel end and a smooth cylindrical surface at the shaft end as in the previously described embodiment. It should be understood that other forms of seal surfaces could be alternatively provided in various embodiments within the scope of the invention.

A single radial mounting flange 162 extends outward from the integral body 150 and includes a radial mounting face 164 and a cylindrical outer pilot surface 166. Pilot surface 166 is engagable with an inner pilot locating surface of the turbocharger housing for radially positioning and supporting the bearing/seal member in the housing. The radial mounting face 164 of flange 162 is engagable with the radial mounting face 80 of the turbocharger housing 13 to locate the bearing/seal member 132 and the supported rotor 134 axially in the housing. The flange 162 is secured to the housing by screws 120 to support and locate the member 132 as in the previously described embodiment.

The bearing/seal member 132 of the invention also optionally includes a thrust bearing in the form of an annular ring or flange 168 having a thrust bearing surface 170. The flange 168 is aligned by pins 172 with the shaft end of the bearing portion 152 of member 132. When assembled, the thrust flange 168 is axially aligned with the inner bearing surface 156 of the bearing portion and the inner cylinder 160 of the seal portion. If desired, the thrust flange 168 could be made as an integral part of the bearing/seal body 150. However, the preferred separate flange 168 reduces manufacturing complexity. Conversely, integration of the bearing and seal portions of the bearing/seal member 132 into a single body 150 simplifies the manufacture and assembly of these portions.

As installed in a turbocharger, the bearing/seal member 132 with associated thrust flange 168 functions in the same manner as the bearing/seal assembly 90 first described, except for the function of the squeeze film damper bearing bushing 158. This bushing supports the shaft bearing journal 54 while the thrust flange accepts thrust loads from the thrust reaction surface 58. The seal inner cylinder 160 also cooperates with outer seal surface 148 of adapter 146 to control oil leakage from the bearing portion 152 of the body 150.

It should be understood that, in its broader aspects, the invention is not limited by the particular form of axial positioning of the bearing or the specific manner of alignment or fastening of the components of the bearing/seal assembly. Also, the placement of the single pilot surface on the radial mounting flange or on a separate surface of the bearing/seal member or assembly may be varied to suit the application. The types of support bearings and lubricant seals used may also be varied, although the invention is particularly suitable for the embodiments described.

The use of a pre-assembled bearing/seal assembly or an integral bearing/seal member as described, provides accurate alignment of the bearing and seal elements in a rotor housing with a reduction in manufacturing tolerances between the assembly and the surrounding machine housing. Thus, quality may be improved and manufacturing costs reduced by the application of the invention in an appropriate apparatus.

The terms integral and integrally are consistently used herein as referring to a single piece or one-piece element, member or body and should be so understood. In some cases, especially in the claims, terms such as one-piece or single piece are included for additional clarity.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A bearing/seal member for supporting and sealing a rotor in a housing of a gas dynamic machine, said member comprising:

a bearing portion having an inner bearing surface for surrounding and radially supporting a bearing journal of the rotor;

a seal portion having an inner seal surface for surrounding an outer seal surface of the rotor; and a body carrying said bearing and seal portions with said inner bearing and seal surfaces in spaced coaxial relation, said body including an outer pilot surface for radially engaging an inner locating surface of the housing, and a generally radial mounting flange axially engagable with a mounting face of the housing for axially positioning the body in the housing, the mounting flange including fastener openings for mounting the body in the housing.

2. A bearing/seal member as in claim 1 wherein said bearing and seal portions of the body are formed as a one-piece integral element.

3. A bearing/seal member as in claim 1 wherein said bearing and seal portions of the body are formed as separate elements and fixed together.

4. A bearing/seal member as in claim 1 wherein said outer pilot surface is formed on said radial flange.

5. A bearing/seal member as in claim 1 wherein said outer pilot surface is formed separate from said radial flange.

6. A bearing/seal member as in claim 1 including a thrust bearing surface at an end opposite from said inner seal surface.

7. A bearing/seal member as in claim 6 wherein said thrust bearing surface is formed on a thrust flange separate from but attached to said bearing portion.

8. A bearing/seal member as in claim 6 wherein said thrust bearing surface is formed as an integral single piece with said bearing portion.

9. A bearing/seal member as in claim 1 wherein said inner bearing surface carries a bearing material that in assembly is fixed relative to the inner bearing surface.

10. A bearing/seal member as in claim 1 wherein said inner bearing surface carries a floating bushing bearing.

11. A bearing/seal member as in claim 1 wherein said outer pilot surface comprises the sole means for radially positioning said member in a housing.

12. A bearing/seal member as in claim 1 wherein said radial mounting flange comprises the sole means for axially positioning said member in a housing.

13. A bearing/seal member for supporting and sealing a rotor in a housing of a gas dynamic machine, said member comprising:
    a bearing portion having an inner bearing surface for surrounding and radially supporting a bearing journal of the rotor;
    a seal portion having an inner seal surface for surrounding an outer seal surface of the rotor; and
    a one-piece body integrally carrying said bearing and seal portions with said inner bearing and seal surfaces in spaced coaxial relation, said body including a generally radial mounting flange axially engagable with a mounting face of the housing for axially positioning the body in the housing, and an outer pilot surface on said flange for radially engaging an inner locating surface of the housing, the mounting flange including fastener openings for mounting the body in the housing.

14. A bearing/seal member as in claim 13 including a thrust bearing disposed at an end adjacent said bearing portion, said thrust bearing formed separately from said body and fixed thereto.

15. A bearing/seal member as in claim 13 wherein said outer pilot surface comprises the sole means for radially positioning said member in a housing.

16. A bearing/seal member as in claim 13 wherein said radial mounting flange comprises the sole means for axially positioning said member in a housing.

17. A bearing/seal member for supporting and sealing a rotor in a housing of a gas dynamic machine, said member comprising:
    a bearing portion having an inner bearing surface for surrounding and radially supporting a bearing journal of the rotor;
    a seal portion having an inner seal surface for surrounding an outer seal surface of the rotor; and
    a body carrying said bearing and seal portions with said inner bearing and seal surfaces in spaced coaxial relation, said body including an outer pilot surface for radially engaging an inner locating surface of the housing, and a generally radial mounting flange axially engagable with a mounting face of the housing for axially mounting and positioning the body in the housing;
    said bearing/seal member including a thrust bearing surface at an end opposite from said inner seal surface.

18. A bearing/seal member as in claim 17 wherein said thrust bearing surface is formed on a thrust flange separate from but attached to said bearing portion.

19. A bearing/seal member as in claim 17 wherein said thrust bearing surface is formed integral with said bearing portion.

20. A bearing/seal member for supporting and sealing a rotor in a housing of a gas dynamic machine, said member comprising:
    a bearing portion having an inner bearing surface for surrounding and radially supporting a bearing journal of the rotor, said inner bearing surface carrying a floating bushing bearing;
    a seal portion having an inner seal surface for surrounding an outer seal surface of the rotor; and
    a body carrying said bearing and seal portions with said inner bearing and seal surfaces in spaced coaxial relation, said body including an outer pilot surface for radially engaging an inner locating surface of the housing, and a generally radial mounting flange axially engagable with a mounting face of the housing for axially mounting and positioning the body in the housing.

21. A bearing/seal member for supporting and sealing a rotor in a housing of a gas dynamic machine, said member comprising:
    a bearing portion having an inner bearing surface for surrounding and radially supporting a bearing journal of the rotor;
    a seal portion having an inner seal surface for surrounding an outer seal surface of the rotor; and
    a body integrally carrying said bearing and seal portions with said inner bearing and seal surfaces in spaced coaxial relation, said body including a generally radial mounting flange axially engagable with a mounting face of the housing for axially mounting and positioning the body in the housing, and an outer pilot surface on said flange for radially engaging an inner locating surface of the housing;
    said bearing/seal member including a thrust bearing disposed at an end adjacent said bearing portion, said thrust bearing formed separately from said body and fixed thereto.

22. An engine turbocharger comprising:
    a housing including an inwardly facing inner locating surface and a generally radial mounting face;
    a rotor mounted in the housing and rotatable on an axis, the rotor including a bearing journal and an outer seal surface adjacent the bearing journal; and
    a bearing/seal member mounted in the housing and including a body carrying bearing and seal portions with inner bearing and seal surfaces in spaced coaxial relation, the inner bearing surface surrounding and radially supporting the bearing journal of the rotor and the inner seal surface surrounding the outer seal surface of the rotor, and a generally radial mounting flange in axial engagement with the mounting face of the housing and secured by fasteners for mounting and axially positioning the body in the housing.

23. An engine turbocharger as in claim 22 wherein said bearing and seal portions of the bearing/seal member body are formed as a one-piece integral element.

24. An engine turbocharger as in claim 22 wherein said bearing and seal portions of the body are formed as separate elements and fixed together.

25. An engine turbocharger as in claim 22 wherein said outer pilot surface is formed on said radial flange.

26. An engine turbocharger as in claim 22 wherein said outer pilot surface is formed separate from said radial flange.

27. An engine turbocharger as in claim 22 including a thrust bearing surface at an end opposite from said inner seal surface.

28. An engine turbocharger as in claim 27 wherein said thrust bearing surface is formed on a thrust flange separate from but attached to said bearing portion.

29. An engine turbocharger as in claim 27 wherein said thrust bearing surface is formed integral with said bearing portion.

30. An engine turbocharger as in claim 22 wherein said inner bearing surface carries a floating bushing bearing.

31. An engine turbocharger as in claim 22 wherein said outer pilot surface comprises the sole means for radially positioning said member in the housing.

32. An engine turbocharger as in claim 22 wherein said radial mounting flange comprises the sole means for axially and radially positioning said member in the housing.

* * * * *